(12) United States Patent
Sherman et al.

(10) Patent No.: US 6,736,517 B2
(45) Date of Patent: May 18, 2004

(54) DUAL MODE LASER PROJECTION SYSTEM FOR ELECTRONIC AND FILM IMAGES

(75) Inventors: Glenn H. Sherman, Del Mar, CA (US); Michael D. Tiberi, Rancho Santa Fe, CA (US)

(73) Assignee: Principia Lightworks Inc., Woodland Hills, CA (US)

( * ) Notice: Subject to any disclaimer, the term of this patent is extended or adjusted under 35 U.S.C. 154(b) by 0 days.

(21) Appl. No.: 10/085,246

(22) Filed: Feb. 28, 2002

(65) Prior Publication Data

US 2002/0126262 A1 Sep. 12, 2002

Related U.S. Application Data

(60) Provisional application No. 60/272,085, filed on Feb. 28, 2001.

(51) Int. Cl.[7] ............... G03B 21/00; G03B 21/26; G03B 1/48; H04N 9/47; H04N 5/64
(52) U.S. Cl. ............... 353/122; 353/95; 353/94; 353/30; 348/97; 348/744; 348/776; 348/780
(58) Field of Search ............... 353/122, 95, 94, 353/69, 30, DIG. 2; 348/96, 97, 744, 776, 780

(56) References Cited

U.S. PATENT DOCUMENTS

| 4,061,911 | A | | 12/1977 | Krasin | 362/20 |
|---|---|---|---|---|---|
| 4,077,705 | A | | 3/1978 | Suzaki | 352/73 |
| 5,254,502 | A | | 10/1993 | Kozlovsky | 437/225 |
| 5,280,360 | A | | 1/1994 | Derdyra et al. | 358/242 |
| 5,283,798 | A | | 2/1994 | Kozlovsky et al. | 372/45 |
| 5,313,483 | A | | 5/1994 | Kozlovsky et al. | 372/15 |
| 5,317,583 | A | | 5/1994 | Nasibov et al. | 372/43 |
| 5,339,003 | A | | 8/1994 | Kozlovsky et al. | 313/463 |
| 5,374,870 | A | | 12/1994 | Akhekyan et al. | 313/463 |
| 5,687,185 | A | | 11/1997 | Kozlovsky et al. | 372/43 |
| 5,774,174 | A | * | 6/1998 | Hardie | 348/38 |
| 6,137,530 | A | * | 10/2000 | Brown | 348/96 |
| 6,229,562 | B1 | * | 5/2001 | Kremen | 348/51 |
| 6,292,617 | B1 | * | 9/2001 | Neyman | 386/42 |
| 6,501,530 | B2 | * | 12/2002 | Kurtz et al. | 352/41 |
| 2002/0060753 | A1 | * | 5/2002 | Flint | 348/744 |
| 2002/0063854 | A1 | * | 5/2002 | Flint | 353/94 |

OTHER PUBLICATIONS

Basov et al., "Laser Cathode–Ray Tubes Using Multilayer Heterostructures," Laser Physics, vol. 6 No. 3 (1996) pp. 608–611.
Mendrala, J., "A Brief History of Film and Digital Cinema," last updated Mar. 3, 2002.

* cited by examiner

Primary Examiner—David Gray
Assistant Examiner—Melissa J Koval
(74) Attorney, Agent, or Firm—Law Offices of James D. McFarland

(57) ABSTRACT

A dual mode laser projection system having a film mode and an electronic mode that can be used to project an image onto a screen. In the film mode an image is projected by illuminating film with lasers, and in the electronic mode an image is created by modulation of with lasers with data to project an electronic image. The laser source may comprise a plurality of lasers each providing a different color, such as red, green, and blue. Laser-CRTs may be used. In some embodiments the laser source is synchronized with the film aperture so that the laser source is modulated to illuminate the film aperture only while a frame of the film is stopped. In some embodiments the color temperature of the light illuminating the film can be selected by increasing and/or decreasing the relative light intensity contribution of each of the lasers.

16 Claims, 3 Drawing Sheets

DUAL MODE LASER PROJECTION SYSTEM FOR ELECTRONIC AND FILM IMAGES

CROSS-REFERENCE TO RELATED APPLICATION

Priority is hereby claimed to U.S. Application No. 60/272,085, filed Feb. 28, 2001, entitled Dual Digital/Film Projection System, which is incorporated by reference herein.

BACKGROUND OF THE INVENTION

1. Field of the Invention

This invention relates to motion picture film projectors such as the type commonly used in motion picture theaters.

2. Description of Related Art

The continuing popularity of motion pictures has created a demand for improved and lower cost projection systems for cinemas as well as for home theaters. Conventional film projectors are costly to purchase, and expensive to operate and maintain. Conventional film is expensive, and unfortunately the film itself wears out too quickly. Eventually, film may be replaced by entire electronic projection systems that require only a stream of data; however, the near-universality of film at the present time ensures that the demand for conventional projectors will continue at least in the near future. Therefore, it would be useful to improve the film projections systems, as well as to provide an electronic alternative. In general, desired improvements to projection systems include higher resolution, lower cost of operation and maintenance, and accurate, and consistent color over time.

Conventional film projectors, such as shown in FIG. 1, include a broadband source of incoherent light such as a projection lamp, a parabolic reflector, a heat (infrared) filter, and an ultraviolet (uv) filter. The incoherent light is provided to conditioning optics that illuminate an aperture, and a film delivery system advances film over the film aperture where each frame of the film is momentarily stopped and illuminated for display. For example, some conventional projectors operate at 24 Hertz; i.e. 24 frames are stopped and displayed each second. A shutter in the aperture blanks the frame (i.e. blocks illumination of the aperture) while the film is moving across the aperture. Furthermore, in order to prevent the appearance of flicker to a moviegoer, the shutter operates at twice the frequency of the frame display; e.g. if the frame display operates at 24 Hz, then the shutter operates at 48 Hz. In other words, while the film is stopped in the aperture, the shutter opens and closes twice. Projection optics project the "moving" image from the illuminated aperture onto a screen. In a typical installation, all components of the film projector are mounted on a console.

The projection lamp is typically a Xenon arc lamp that is coupled to a specially coated parabolic reflector to dissipate heat and uv radiation and focus "white" light from the Xenon lamp onto the film aperture. High intensity Xenon lamps operate continuously, and emit only about 50% of their energy as usable, visible light; the remaining energy is emitted as infrared and ultraviolet radiation. Given a typical Xenon lamp rating of 3,000 watts, a tremendous amount of waste heat and uv radiation is produced. Although most of the waste heat is filtered out by the heat filter, a small fraction leaks through, enough to damage the film. Furthermore, a small fraction of the uv radiation leaks through the uv filter, and this ultraviolet radiation rapidly degrades the dyes in the film, resulting in a loss of color fidelity in a short time. In other words, non-visible radiation produced by high intensity arc lamps effectively degrades and damages a film print and drastically shortens its useful lifetime. The parabolic reflector, which reflects the high intensity light from the flashlamp, also suffers damage from non-visible radiation and is costly to replace.

Of the 50% usable light emitted by a Xenon lamp in a typical motion picture projector, only a small amount of this percentage, typically less than 10%, actually can be used to illuminate the film aperture, in part due to optical losses and also due to emission by the lamp in all directions. Furthermore, the film typically absorbs about 25% of the incident light, leaving less than 8% of the visible light for projection on the screen. Therefore, typically less than about 5% of the total power of a Xenon lamp is utilized to illuminate the film, and less than about 4% of the total power is actually projected onto the screen. Thus, over 95% of the light emitted by the Xenon lamp is waste energy, much of it in the form of heat that must be dissipated in some way.

Electronic projectors have been proposed to replace film projectors. Electronic projectors are "film-less", requiring only a stream of data (in an electronic form such as digital or analog) to generate a high resolution image, instead of the series of physical images embedded in film. However, electronic projectors for cinemas are in their early stages of development and implementation, and are not yet widely accepted. To promote acceptance of electronic projection systems in cinemas that traditionally have relied upon film projectors, it would be advantageous if the same projector could accommodate either film or electronic images.

Modulated laser projection systems, such as shown in FIGS. 2 and 3, are electronic projectors that have been proposed to replace film projectors. A laser emits a highly directional beam of radiation at a predetermined wavelength. For laser projection systems, a red laser, a green laser, and a blue laser are used to represent the full spectral range to the human eye. The lasers (or the beams from the lasers) are modulated in accordance with electronic image information, and then projected to provide the appropriate color at each pixel of the image. Some laser display systems modulate and then scan the laser beams, while other laser display systems directly modulate the beam imaged onto the screen.

SUMMARY OF THE INVENTION

A dual mode laser projection system is disclosed that has a film mode and an electronic mode, either of which can be used for projecting an image onto a screen. In the film mode an image is projected by illuminating film with lasers, and in the electronic mode an image is created by modulation of lasers with data to project an electronic image. Thus, the same projector can be used like a film projector to project film images, or it can be used to project an electronic image by modulation of the lasers using electronic means.

The laser projection system comprises a laser source that provides light having a plurality of colors, projection optics, a film module that includes a film aperture and a film delivery system that advances film over the film aperture, and an electronic module that includes a laser beam modulation system. In the film mode the film module is situated to receive the light from the laser source, and the film aperture is configured to be illuminated by the light, thereby to supply an image to the projection optics for projection onto the screen. In the electronic mode, the electronic module is situated to receive the light from the laser source, and supply modulated laser light to the projection optics to project an image onto the screen.

In some embodiments, the film aperture includes a system that momentarily stops each frame for illumination, and in the film mode, the laser source is synchronized with the film aperture so that the laser source is modulated by the laser beam modulation system to illuminate the film aperture substantially only while a frame of the film is stopped. In other embodiments, the aperture comprises a shutter. The laser source may comprise a plurality of lasers each providing a different color, including a red laser, a green laser, and a blue laser. In some embodiments, the laser source comprises a plurality of Laser-CRTs, each providing a different color, including a red Laser-CRT, a green Laser-CRT, and a blue Laser-CRT.

One advantage of using a laser source to illuminate film is that lasers primarily emit highly directional, visible laser radiation at a single wavelength, thereby avoiding emitting harmful radiation (e.g. uv radiation) and heat, which would otherwise damage the film, thereby extending the film's lifetime and quality. Furthermore, the laser projection system is substantially more energy efficient than Xenon lamp-based system.

In some embodiments, the color temperature of the light illuminating the film can be selected by using a color temperature control system to increase and/or decrease the relative light intensity contribution of each of the lasers. The ability to select color temperature could be useful, for example, to allow a filmmaker the artistic freedom to select a color temperature for illuminating the film, or different color temperatures for different parts of the film. Furthermore, the viewing experience would be consistent for all viewers because the color temperature would be closely controlled. In summary, the ability to control color temperature provided by color temperature control system allows color flexibility for filmmakers, while providing color consistency for moviegoers.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the Figures, in which like numbers represent the same or similar elements.

Film Projection Systems

Figure 1:
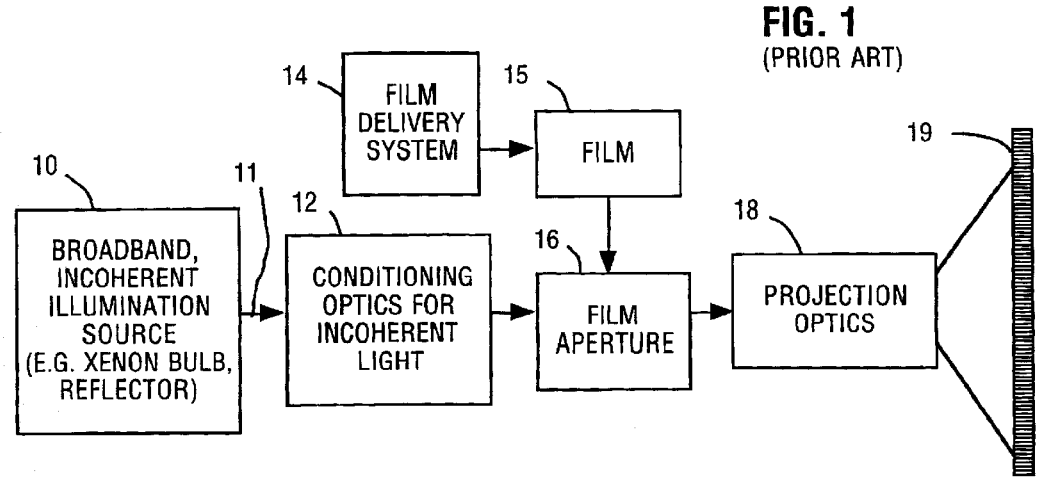
FIG. 1 is a block diagram of a prior art film projection system.

FIG. 1 is a block diagram of a conventional film projector that includes a broadband, incoherent illumination source 10 that continuously emits incoherent light 11, conditioning optics 12 for the incoherent light, a film delivery system 14 that advances film 15 over a film aperture 16 where the film is illuminated by the incoherent light. A standard film format includes a series of images (frames) that are successively displayed to create the appearance of motion. The film aperture 16 includes a mechanism that momentarily stops each frame of the film in a fixed position for a period of time during which the frame is illuminated for display. Conventional projectors display frames at a fixed frequency such as 24 Hz; e.g. 24 frames are displayed each second. Because the illumination source operates continuously, a shutter in the aperture blanks the frame (i.e. blocks illumination of the aperture) while the film is moving across the aperture. Furthermore, in order to prevent the appearance of flicker to a moviegoer, the shutter operates at twice the frequency of the frame display; e.g. if the frame display operates at 24 Hz, then the shutter operates at 48 Hz. In other words, while the film is stopped in the aperture, the shutter opens and closes twice. Projection optics 18 then project what appears to be a moving image from the illuminated aperture onto a screen 19.

The illumination source 10 typically includes a xenon arc lamp and a parabolic reflector that reflects light emitted from the lamp. The conditioning optics 12 may comprise a heat (infrared) filter, an ultraviolet (UV) filter, and an optical system that directs light from the lamp onto the film aperture. The film delivery system 14 typically includes reel holders and a transport mechanism to advance the film 15 across the film aperture 16. The projection optics 18 may include a lens turret that has a number of lenses and one or more motors that rotate the turret to change lenses in response to user commands. In a typical installation, all components of the film projector are mounted on a console that includes a control panel that provides a user interface with the projector mechanism.

Laser Projection Systems

Figure 2:
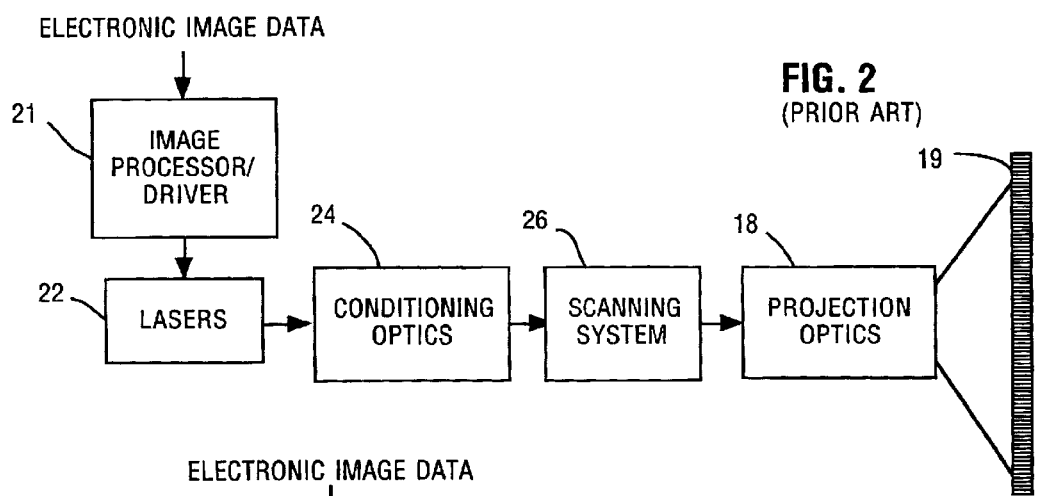
FIG. 2 is a block diagram of a prior art laser projection system in which the lasers are directly modulated.
Figure 3:
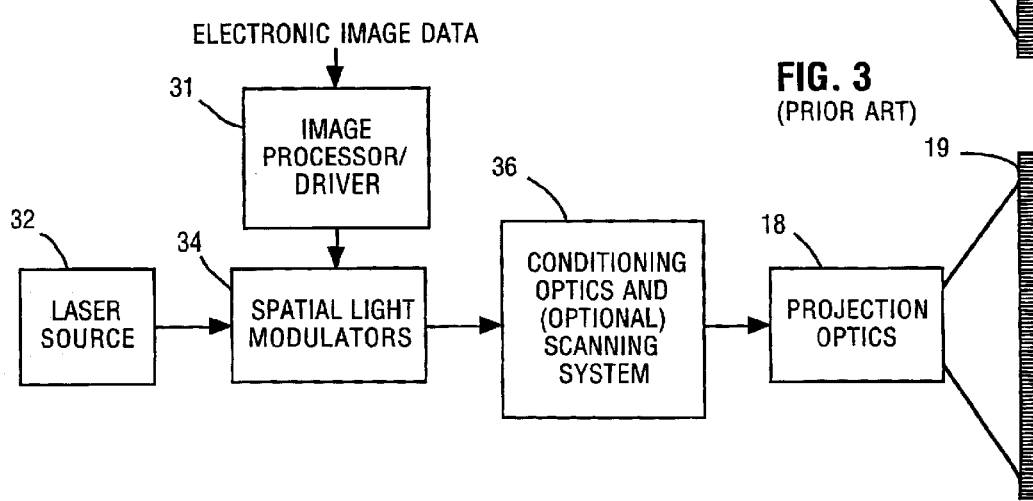
FIG. 3 is a block diagram of a prior art laser projection system in which the laser beams are modulated by a spatial light modulator (SLM)

FIGS. 2 and 3 are block diagrams of two prior art laser projection systems. In FIG. 2, the laser projection system includes image processor/driver 21 that modulates the lasers 22 in response to electronic image data (e.g. a digital data file) that defines an image. In order to represent the full spectral range of the human eye, the lasers 22 may comprise red lasers, blue lasers, and green lasers. After the lasers 22 have been modulated in accordance with electronic image data, the modulated laser beams are provided to conditioning optics 24 which may for example include a beam combiner that combines the beams of different colors into a single beam. To provide the image on the screen, some projection systems scan the laser beams, while other systems display the beam directly without scanning. If the projection system is of the scanning type, then the beam is scanned by a scanning system 26, if the system is not of the scanning type, then this system 26 is omitted. The beam is then projected using projections optics 18 onto the screen 19. In summary, in FIG. 2 the laser beam modulation system comprises a direct write modulation system in which each laser is individually modulated (i.e. controlled) to emit radiation at the desired time and intensity level.

In FIG. 3, the laser beam modulation system comprises one or more spatial light modulators 34 that modulate each beam from the laser source 32. The spatial light modulator 34 is modulated by any suitable image processor/driver 31 in response to electronic image data that defines an image to be projected. The laser source 32 comprises any suitable laser(s) for projection purposes, such as lasers that generate red, green, and blue beams. After modulating the laser beams from the laser source 32 in the spatial light modulator 34, the modulated beams are then supplied to conditioning optics 36 which may include a beam combiner that combines the beams of different colors into a single beam. If the laser projection system is of the scanning type, the beam is also supplied to a scanning system. The image is then projected by projection optics 18 onto a screen 19.

Description of A Dual Mode Projector

Figure 4:
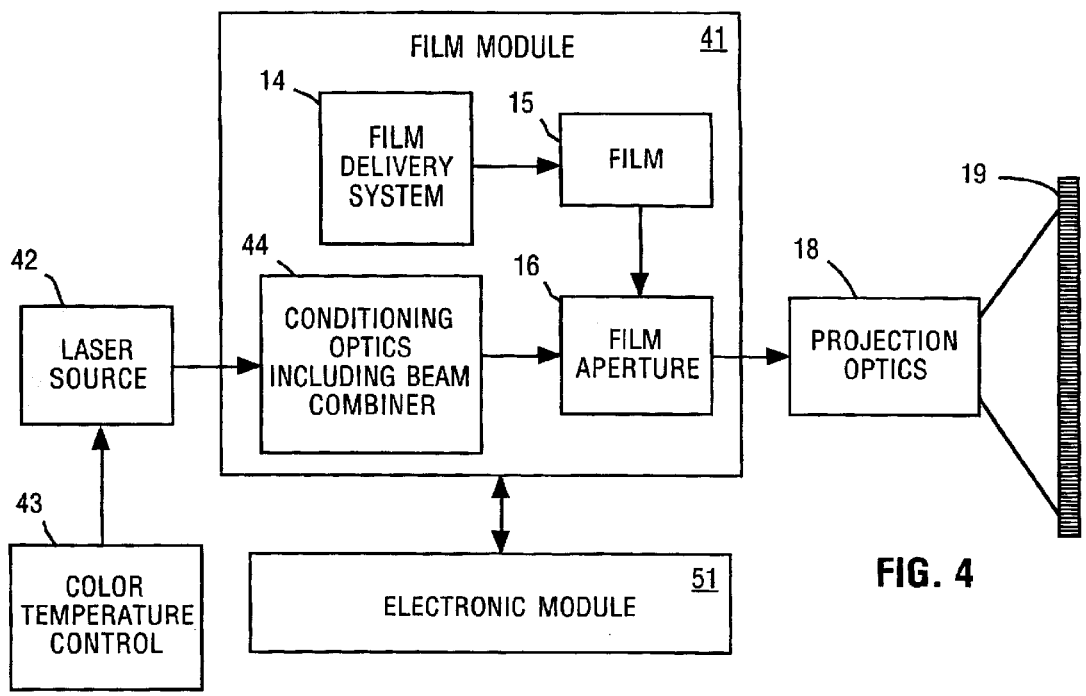
FIG. 4 is a block diagram of a dual mode projection system in the film mode.
Figure 5:
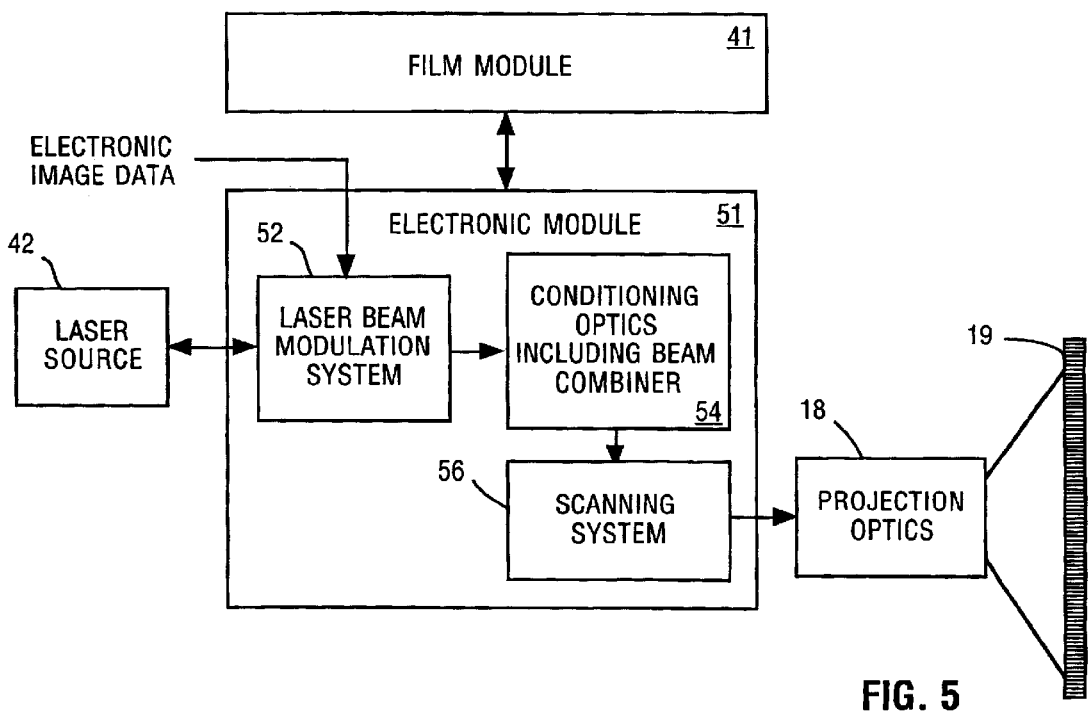
FIG. 5 is a block diagram of a dual mode projection system in the electronic mode.

Reference is now made to FIGS. 4 and 5 to show one embodiment of a projection system that can be used in two different configurations ("modes"). Particularly, FIG. 4 shows a configuration (a "film mode") in which a film module 41 is selected to provide the image source and FIG. 5 shows a second configuration (an "electronic" mode) in which an electronic module 51 is selected. Both the electronic mode and the film mode utilize the same laser source 42, which provides cost savings. For example, the conventional illumination source, including a film projection lamp and its attendant components and housing, can be replaced by a lamp house that includes a laser source 42.

FIG. 4 is a block diagram of the film mode, showing the film module 41 selected to provide the image source. The film module comprises a film delivery system 14, film 15, a film aperture 16, and conditioning optics 44 including a beam combiner.

In FIG. 4, the laser source 42 is used to illuminate the film aperture 16 over which film 15 is advanced, thereby replacing the conventional Xenon lamp. The laser source 42 includes one or more red, green and blue lasers that can be combined to provide "white" light, suitable for illuminating film during the period while the frames are momentarily stopped in the aperture. Furthermore, as discussed with reference to the electronic mode in FIG. 5, the laser source 42 (or the beams) is suitable for modulation. The laser source 24 comprises one or more suitable lasers, such as semiconductor lasers, diode-pumped solid-state lasers, gas lasers, and Laser-CRTs (as discussed below with reference to FIGS. 6 and 7). The lasers may operate pulsed (e.g. Q-switched) or cw (continuous wave).

For cinema applications, the laser source 42 must provide enough output power to illuminate a film aperture to meet standard brightness requirements acceptable to the motion picture industry. The Society of Motion Picture and Technical Engineers have defined the amount of luminous flux on a motion picture screen to be 16foot-lamberts with no film in the aperture (SMPTE 196M). A typical motion picture screen of 500 square feet would require a total of 8,000 lumens. Therefore, depending on the specific wavelength of the individual red, green and blue lasers for the appropriate "white light", each laser must deliver sufficient average output power to meet the brightness standard. If the projector is used exclusively for electronic (digital) images, then the output power of the lasers can be less than the requirement for film images because the film consumes about 25% of the illuminant light. Thus, for projecting electronic images, the output power can be reduced to about twelve foot-lamberts on the motion picture screen.

A color temperature control system 43 includes intensity controls for each laser color, which allows selection of color temperature. Because the white light is generated by combining different colors, the color temperature of the white light that illuminates the film can be selected by increasing and/or decreasing the relative light intensity contribution of each of the lasers. This could be useful, for example, to allow a filmmaker the artistic freedom to select a color temperature for illuminating the film, or different color temperatures for different parts of the film. Furthermore the viewing experience would be consistent for all viewers because the color temperature would be closely controlled. In summary, the ability to control color temperature provided by the color temperature control system 43 allows color flexibility for filmmakers, while providing color consistency for moviegoers.

The laser beams from the laser source 42 are provided to the film module 41, which includes conditioning optics 44 including a beam combiner that combines the red, green, and blue beams to provide a "white" light source, and further conditions the beam as appropriate. It may be noted that, due to the monochromatic nature of laser radiation, it may not be necessary to utilize a uv filter and/or an IR filter in the conditioning optics. The combined, conditioned beam is then used to illuminate a film aperture 16.

In the film module 41, the film delivery system 14 advances film 15 across the film aperture 16, momentarily stopping each frame in the illuminated aperture for a predetermined time (e.g. 30 milliseconds) and at a predetermined rate (e.g. 24 Hz). In some embodiments, the aperture 16 includes a shutter that blocks illumination while the film is moving, and is operated at a rate to prevent the appearance of flicker (e.g. 48 Hz). In other embodiments the laser source may be electronically controlled so that it does not illuminate the aperture during the time during which the film is moving (such as by direct or indirect modulation, or simply turning it off) using a synchronization system, and furthermore the laser source may be electronically controlled to prevent the appearance of flicker. In such embodiments, electronic control replaces the function of the shutter, and therefore the shutter can be eliminated.

The apparently "moving" film image is then projected upon the screen 19 by projection optics 18. In some embodiments, the projection optics 18 may be the same for both the electronic mode (FIG. 5) and the film mode (FIG. 4), which provides a cost savings. In other embodiments, different projection optics may be used for reasons relating to optical design considerations, for example.

FIG. 5 is a block diagram of the electronic mode, showing the electronic module 51 selected to provide the image source. The electronic module 51 comprises a laser beam modulation system 52 coupled to the laser source 42, conditioning optics 54 including a beam combiner, and a scanning system 56.

In FIG. 5, the projector is configured so that modulated laser beams create images from electronic data. In the electronic module 51, the laser beam modulation system 52 comprises any suitable system for modulating the laser source 42 in response to electronic image data to create the desired image. Examples of modulation systems include the direct modulation system for the lasers as described with reference to FIG. 2, or the modulation system using spatial light modulators SLMs described with reference to FIG. 3.

The modulated beam from the modulation system 52 is supplied to conditioning optics 54 that combine the beams as desired or necessary and conditions the modulated beam for scanning and projection. To provide the image on the screen, some projection systems scan the laser beams, while other systems display the beam directly without scanning. If the projection system is of the scanning type, then the beam is scanned by a scanning system 56, if the system is not of the scanning type, then this system 56 is not necessary. The resulting electronic image is then projected upon the screen 19 by projection optics 18.

In order to change the configuration between the film mode and the electronic mode, the film module 41 may be situated in a first assembly, and the electronic module 51 may be situated in a second assembly. Such an arrangement would allow for straightforward switching between the two modes, by allowing the laser source and the projection optics to be switched and aligned as appropriate depending upon whether the film mode or the electronic mode is chosen.

Laser-CRT Projection System

One particularly suitable laser for use in a projection system is a laser cathode ray tube (Laser-CRT), which comprises a vacuum tube, an electron beam scanner, and a faceplate formed with a plurality of lasers. In a Laser-CRT, each pixel of a screen emits a laser beam in response to pumping by the electron beam generated in the CRT. Examples of such a Laser-CRT are disclosed in U.S. Pat. Nos. 5,254,502; 5,280,360; 5,283,798; 5,313,483; 5,317,583; 5,339,003; 5,374,870; 5,687,185; and in Basov et al., Laser Cathode-Ray Tubes Using Multilayer Heterostructures, Laser Physics Vol. 6 No. 3, (1996) pp. 608–611.

Figure 6:
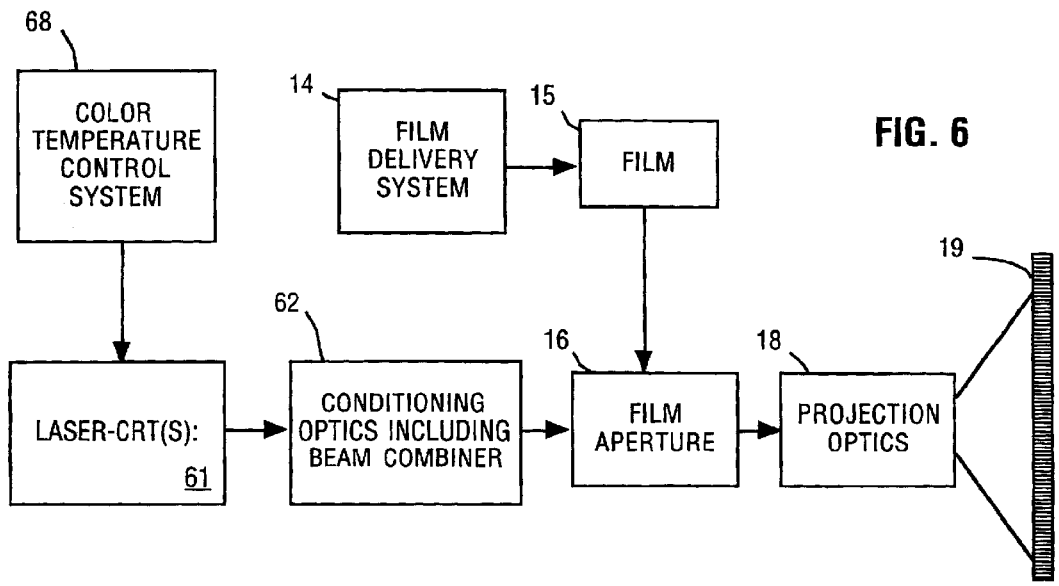
FIG. 6 is a block diagram of a film projection system that uses a Laser-CRT to provide white light to illuminate the film.

FIG. 6 is a block diagram of a film projector that uses Laser-CRTs 61 as an illumination source to illuminate a film aperture 16 with "white" light during the period while each frame is momentarily stopped in the aperture. In one embodiment the Laser-CRTs 61 include three Laser-CRTs: a first CRT generating red light, a second CRT generating green light, and a third CRT generating blue light, thereby providing "white" light as a combination of red, green, and blue laser light. The red, green and blue light are then supplied to conditioning optics 62 that conditions the beams as appropriate or necessary and combines the beams to provide "white" light. The combined, conditioned beam then illuminates the film aperture 16.

In operation, the film delivery system presents film 15 to the film aperture 16, which momentarily stops each frame for illumination by the Laser-CRTs 61. It may be noted that Laser-CRTs generate light by scanning an electron beam across a faceplate. Therefore, in order to illuminate each frame while it is stopped in the aperture, the Laser-CRTs are synchronized with the film delivery system and aperture so that the full faceplate of each Laser-CRT is scanned while the frame is stopped in the aperture, using a suitable synchronization system. For example, if the frame is stopped in the aperture for 0.05 seconds, then the full faceplates of each of the red, green, and blue Laser-CRTs are scanned to illuminate the full aperture during that 0.05 second interval with red, green, and blue (collectively "white") light. The resulting image from the aperture 16 is projected onto a screen 19 by projection optics 18. It may be noted that a shutter in the film aperture is not necessary because illumination occurs only when the Laser-CRT is being scanned; i.e. illumination is controlled electronically using the Laser-CRT rather than mechanically as with a shutter, and therefore, the shutter may be eliminated from the aperture.

In alternative embodiments a single Laser-CRT may be used in place of multiple Laser-CRTs. In this embodiment, the individual pixels of the faceplate of the Laser-CRT are designed to produce a combination of colors that provides white light.

A color temperature control system 68 is provided to allow adjustment of the color temperature of the white light from the Laser-CRTs. The color temperature control system 68 includes intensity controls for each laser color, which allows selection of color temperature. Particularly, the color temperature of the white light that illuminates the film can be selected by increasing and/or decreasing the relative light intensity contribution of each of the colors. For example, in an embodiment that comprises red, green, and blue Laser-CRTs, the color temperature can be selected by individually controlling each of the red, green, and blue Laser-CRTs.

Figure 7:
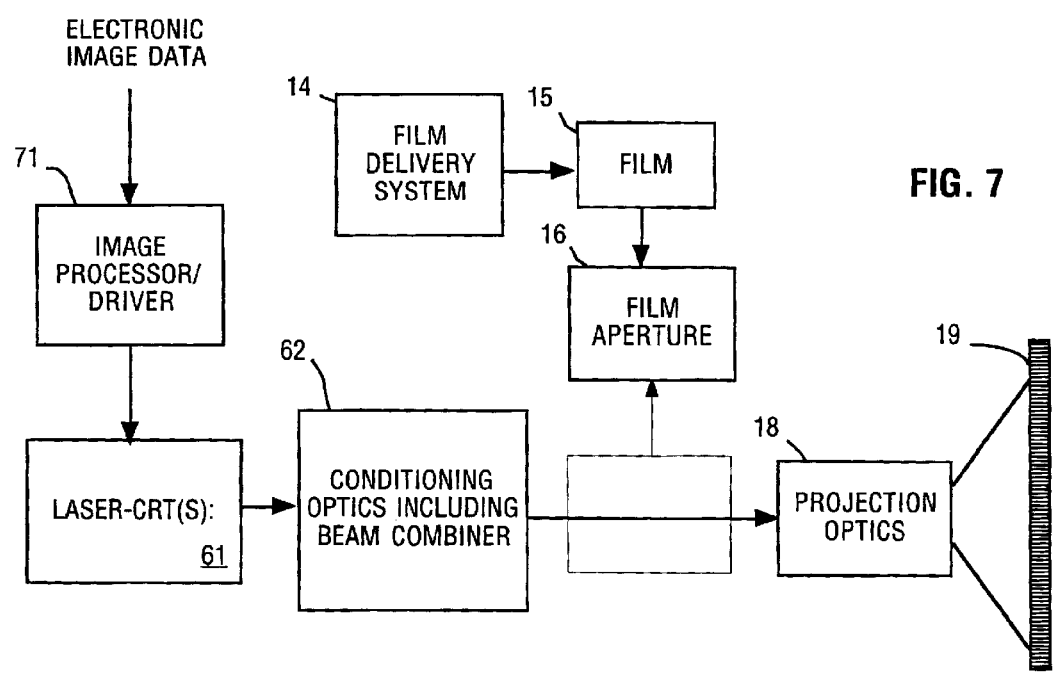
FIG. 7 is a block diagram of a dual mode projection system that uses a Laser-CRT.

FIG. 7 is a block diagram of an embodiment of a dual mode projection system that utilizes Laser-CRT(s) 61 in a film mode for white light illumination of the film aperture 16 as described with reference to FIG. 6, and in an electronic mode as shown in the configuration FIG. 7. Particularly, in the electronic mode, the Laser-CRT(s) 61 are modulated directly by an image processor/driver 71 in response to electronic image data indicative of the image to be displayed. For example, if the Laser-CRTs include a red, green, and a blue Laser-CRTs, then each of the Laser-CRTs is individually controlled to provide the image on their faceplates corresponding to their respective color. The conditioning optics 62 includes a beam combiner that combines the beams from the Laser-CRTs (as necessary or desirable), and also conditions the beams (as necessary or desirable).

As shown in FIG. 7, the assembly that houses the film aperture 16 may be moved aside to allow unimpeded passage of the modulated beam; however in some embodiments it may not be necessary or desirable to move the film aperture 16, and accordingly the film aperture housing could be simply left in place. Projection optics 18 project the resulting beam onto the screen 19.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A dual mode laser projection system that has a film mode and an electronic mode for projecting an image onto a screen, comprising:

a laser source that provides light having a plurality of colors;

projection optics;

a film module that includes a film aperture and a film delivery system that advances film over said film aperture;

wherein in the film mode said film module is situated to receive said light from said laser source, and said film aperture is configured to be illuminated by said light, thereby to supply an image to said projection optics for projection onto the screen;

an electronic module that includes a laser beam modulation system; and wherein in the electronic mode, said electronic module is situated to receive said light from said laser source, and supply modulated laser light to said projection optics to project an image onto the screen.

2. The laser projection system of claim 1, wherein said film comprises a series of frames, and wherein:

said film aperture includes a system that momentarily stops each frame for illumination, and in said film mode, said laser source is synchronized with said film aperture so that said laser source is modulated by said laser beam modulation system to illuminate said film aperture substantially only while a frame of said film is stopped.

3. The laser projection system of claim 1, wherein said aperture includes a shutter.

4. The laser projection system of claim 1, further comprising a color temperature control system for specifying the color temperature of the light from the laser in the film mode.

5. The laser projection system of claim 1, wherein said laser source comprises a plurality of lasers each providing a different color, including a red laser, a green laser, and a blue laser.

6. The laser projection system of claim 1, wherein said laser source comprises a plurality of Laser-CRTs each providing a different color, including a red Laser-CRT, a green Laser-CRT, and a blue Laser-CRT.

7. A dual mode laser projection system that has a film mode and an electronic mode for projecting an image onto a screen, comprising:

a laser source that provides light having a plurality of colors;

projection optics arranged to project the image onto said screen;

a film module that includes conditioning optics including a beam combiner, a film aperture, and a film delivery system that advances film over said film aperture;

wherein in the film mode said film module is situated to receive said light from said laser source, said beam combiner is configured to combine said plurality of colors into a single beam, and said film aperture is configured to be illuminated by said single beam, thereby to supply an image to said projection optics for projection onto the screen;

an electronic module that includes a laser beam modulation system, conditioning optics including a beam combiner, and a scanning system; and wherein in the electronic mode said electronic module is situated to receive said light from said laser source, said beam combiner is configured to combine said plurality of colors into a single beam, and said film aperture is configured to be illuminated by said single beam, thereby to supply an image to said projection optics for projection onto the screen.

8. The laser projection system of claim 7, wherein said film comprises a series of frames, and wherein:

said film aperture includes a system that momentarily stops each frame for illumination, and in said film mode, said laser source is synchronized with said film aperture so that said laser source is modulated by said laser beam modulation system to illuminate said film aperture substantially only while a frame of said film is stopped.

9. The laser projection system of claim 7, wherein said aperture includes a shutter.

10. The laser projection system of claim 7, further comprising a color temperature control system including intensity control for each color, thereby specifying the color temperature of the white light source.

11. The laser projection system of claim 7, wherein said laser source comprises a plurality of lasers each providing a different color.

12. The laser projection system of claim 11, wherein said plurality of lasers include a red laser, a green laser, and a blue laser.

13. The laser projection system of claim 11, further comprising a color temperature control system including intensity control for each color, thereby specifying the color temperature of said white light.

14. The laser projection system of claim 7, wherein said laser source comprises a plurality of Laser-CRTs.

15. The laser projection system of claim 14, wherein said plurality of Laser-CRTs include a red Laser-CRT, a green Laser-CRT, and a blue Laser-CRT.

16. The laser projection system of claim 14, further comprising a color temperature control system including intensity control for each color, thereby specifying the color temperature of said white light.

* * * * *